US007477247B2

(12) United States Patent
Yee

(10) Patent No.: US 7,477,247 B2
(45) Date of Patent: Jan. 13, 2009

(54) DETECTING ATTACHMENT OR REMOVAL OF A DISPLAY MONITOR

(75) Inventor: Dawson Yee, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 11/056,770

(22) Filed: Feb. 11, 2005

(65) Prior Publication Data

US 2006/0181480 A1 Aug. 17, 2006

(51) Int. Cl.
*G06F 3/038* (2006.01)

(52) U.S. Cl. ........................ 345/213; 345/204; 345/211

(58) Field of Classification Search ................. 345/213, 345/204-205, 699, 211-215
See application file for complete search history.

(56) References Cited

U.S. PATENT DOCUMENTS

2002/0005840 A1* 1/2002 Wicker ....................... 345/204
2005/0122278 A1* 6/2005 Hansen et al. ............... 345/3.1

* cited by examiner

*Primary Examiner*—Richard Hjerpe
*Assistant Examiner*—Christopher E Leiby
(74) *Attorney, Agent, or Firm*—Workman Nydegger

(57) ABSTRACT

A change in state is detected at an output port terminal of a video graphics adapter card when an analog monitor is connected or disconnected. A negative current source causes a negative voltage to be developed at the output port terminal during a blanking interval of a color drive signal. A voltage comparator having one input coupled to the output port terminal and another input coupled to a voltage reference provides an output during the blanking interval that serves as an indication of the state (i.e., of whether the monitor is connected), to an operating system executing on a computing system in which the video adaptor card is installed. The negative voltage input to the comparator changes due to the input impedance of the monitor, enabling the comparator to detect the change in state.

21 Claims, 4 Drawing Sheets

DETECTING ATTACHMENT OR REMOVAL OF A DISPLAY MONITOR

FIELD OF THE INVENTION

The present invention generally pertains to a method and system for detecting when a display monitor is connected to or disconnected from a device, and more specifically, for detecting when an analog display monitor is connected to or disconnected from a video output terminal of a computing device, such as a personal computer (PC).

BACKGROUND OF THE INVENTION

Video adaptor cards that can drive two monitors have been available for PCs for some time. Also, a PC can includes two or more video adaptor cards, each of which is able to drive at least one monitor. However, a problem arises when a user attempts to disconnect or connect an analog video graphics array (VGA) monitor to a PC without rebooting the PC after such a change is made. There is no reliable method currently available for a computing device to universally and reliably detect when an analog monitor is connected or disconnected from the video graphics adaptor of the computing device. Detecting when such a monitor is disconnected from a "running" computer system is especially important, since the change can occur when the user is switching from a multiple monitor display environment to a single monitor environment, or when a secondary display is connected/disconnected to/from a PC or laptop computer, such as a display projector that is being used during a presentation. Because the monitor disconnect is not detected by the operating system, the user can be left with a "phantom" monitor situation where cursors and window panes are treated by the operating system as if they were continuing to be displayed on what is then a non-connected monitor. Problems can also arise when a laptop is connected/disconnected to/from a docking station that is coupled to an external analog monitor, or its video output terminal is directly connected to or disconnected from an external analog monitor as a result of the computing system's inability to detect whether the external analog monitor is connected to the system.

Although some newer Video Electronics Standards Association (VESA) monitors integrate Extended Display Identification Data (EDID) signals onto a VGA connector, not all VGA monitors (especially older monitors) or conference room VGA projectors include EDID information. EDID is a data structure provided by a monitor to describe its capabilities to a video graphics adaptor card, enabling a PC to know what kind of monitor is connected. EDID is defined by a standard published by VESA. The information provided to a PC from an EDID capable monitor includes a manufacturer name, a product type, phosphor or filter type, timings supported by the display, display size, luminance data and (for digital displays only) pixel mapping data. Although a PC could detect when signals conveying EDID are connected or disconnected to a VGA port on a video graphics adaptor card, the fact that many monitors do not provide the signals conveying EDID information means that this method is not usable to reliably detect the hot connect or disconnect of any analog monitor to a video graphics adaptor card.

Typically, the prior art has relied on analog monitor attach detection during computer boot-up. In this case, the connected state of the one or more monitors is detected at boot-up. Also, if no monitor is connected to a video adaptor on a PC when the PC is booted up, the PC may produce an audible beeping code as an error signal indicating that no monitor is connected, and preventing the PC from completing the boot-up. However, once booted-up, there is no provision in this prior art detection scheme to "hot detect" that an analog monitor has been disconnected from the PC, or to "hot detect" when, for example, an analog monitor has been connected. While detection of digital monitors is provided by new monitor standards (EDID/DDC or DVI), which are able to detect when a digital monitor is connected to or disconnected from a DVI drive port, there is no provision for providing the same function in regard to an analog video graphic adaptor (VGA) monitor. Thus, it would be desirable to develop a method that will detect the connection or disconnection of any analog monitor to a computing system via the ubiquitous 15-pin VGA connector that has been used on computing systems since about 1987. The detection system should not require any modification of an analog monitor, i.e., should be transparent to the monitor and the user and should detect the hot connect or disconnect of any such analog VGA monitor.

SUMMARY OF THE INVENTION

Accordingly, one aspect of the present invention is directed to a method for detecting whether a generally conventional analog monitor is connected to a computing device. In this method, a state of a signal at an output port of a video display adaptor is monitored to detect a change in state of the signal. The change in state occurs in response to an analog monitor being connected or disconnected to the output port. An input impedance of the monitor causes the state of the signal to change in a first predefined manner, when the input impedance of the analog monitor is coupled to the output port, and in a second predefined manner as a result of the input impedance of the analog monitor no longer being coupled to the output port. An indication is then provided in response to a change in the state of the signal. The indication is only detected during a blanking interval.

In a preferred embodiment, the signal has a negative voltage level that is developed across a resistance to ground at the output port. Substantial changes in the voltage level are thus indicative of a change in the state of the signal during the blanking interval. Accordingly, the negative voltage level is substantially changed when the input impedance of the analog monitor is placed in parallel with the resistor that is coupled to the output port. In one preferred embodiment, the resistance of the resistor is substantially equal to the input impedance of the analog monitor.

The step of monitoring the state of the signal preferably comprises the step of comparing a negative voltage level of the signal to a reference voltage. The negative voltage level is kept sufficiently low so as not to trigger any electrostatic discharge circuitry in the monitor. Any change in state is then detected when a relationship between the negative voltage level and the reference voltage changes substantially. The signal that is employed for this function can be the green drive signal, the red drive signal, or the blue drive signal that is provided to the output port as a color component for use by the analog monitor in displaying an image. The method also further includes the step of supplying the indication of any change in the state of the signal to an operating system that is executing on a computing device that includes the output port. The indication of change in state enables the operating system to respond to the connection or disconnection of the analog monitor at the output port.

Another aspect of the present invention is directed to a circuit for detecting whether a generally conventional analog monitor is connected to a computing device. The circuit includes a comparator for comparing a reference signal to a negative signal that is provided to an output port. The output port is also connected to receive a color signal for output to an analog monitor to produce an image. The comparator produces an indication of whether an analog monitor is currently connected to the output port, or disconnected from the output port. A negative current source is coupled to the output port during a blanking interval of the color signal and then causes the negative signal to be developed at the output port for input to the comparator. The negative signal, which is developed across an impedance that is coupled between the output port and ground, has a first level if an analog monitor is coupled to the output port, and a second level that is different than the first level, if an analog monitor is not connected to the output port. The indication produced by the comparator thereby changes in response to changes between the first and the second level of the negative signal, to indicate whether an analog monitor is currently connected to the output port, or is currently disconnected from the output port.

An electronic switch is preferably included to control the negative current source so that the negative signal is applied to the output port and the comparator only during the blanking interval of the color signal. The comparator and the negative current source are preferably disposed on a display adaptor card that is adapted to be connected to a computing device. The comparator comprises a voltage comparator having an output on which the indication is provided based upon a comparison of a reference voltage level and a voltage level of the negative signal. The indication produced by the comparator is adapted to be conveyed to a computing device, to enable an operating system executing on the computing device to respond in a predefined manner, depending on whether an analog monitor is currently connected to the output port.

Yet another aspect of the present invention is directed to a display adaptor that includes a circuit generally as discussed above, as well as a display driver circuit to provide drive signals to an analog monitor to enable the monitor to produce an image.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 2A:
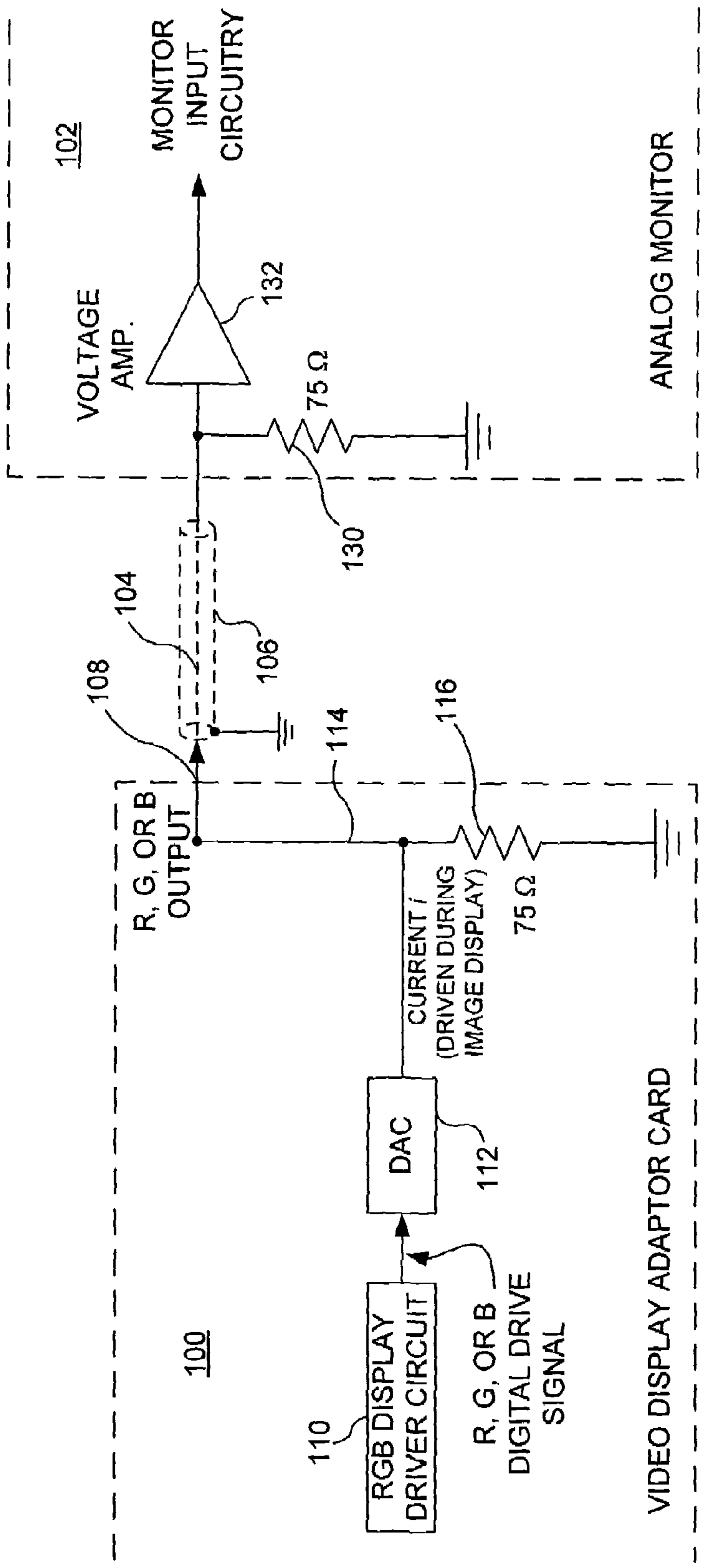
FIG. 2A (PRIOR ART)
FIG. 2A (Prior Art) is a schematic circuit diagram that shows one of three color drive signals coupled to an output port of a generally conventional video display adaptor card, and an input of a generally conventional analog monitor coupled to the output port through a shielded cable.
Figure 2B:
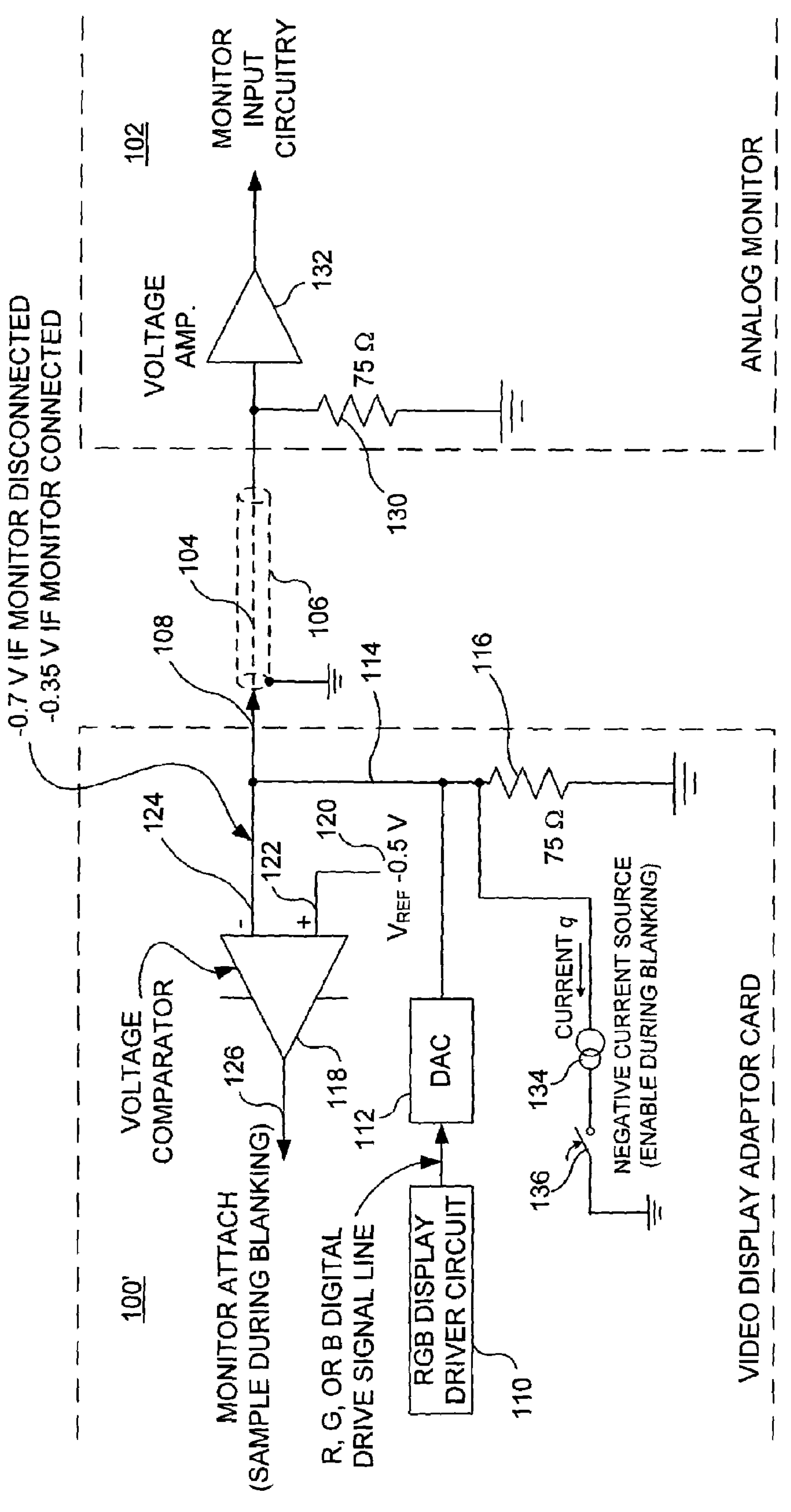
FIG. 2B is a schematic circuit diagram of a video display adaptor card with a circuit in accord with the present invention, for producing an indication of whether an input impedance of a conventional analog monitor is currently connected to or disconnected from the output port of the video display adaptor card.
Figure 3:
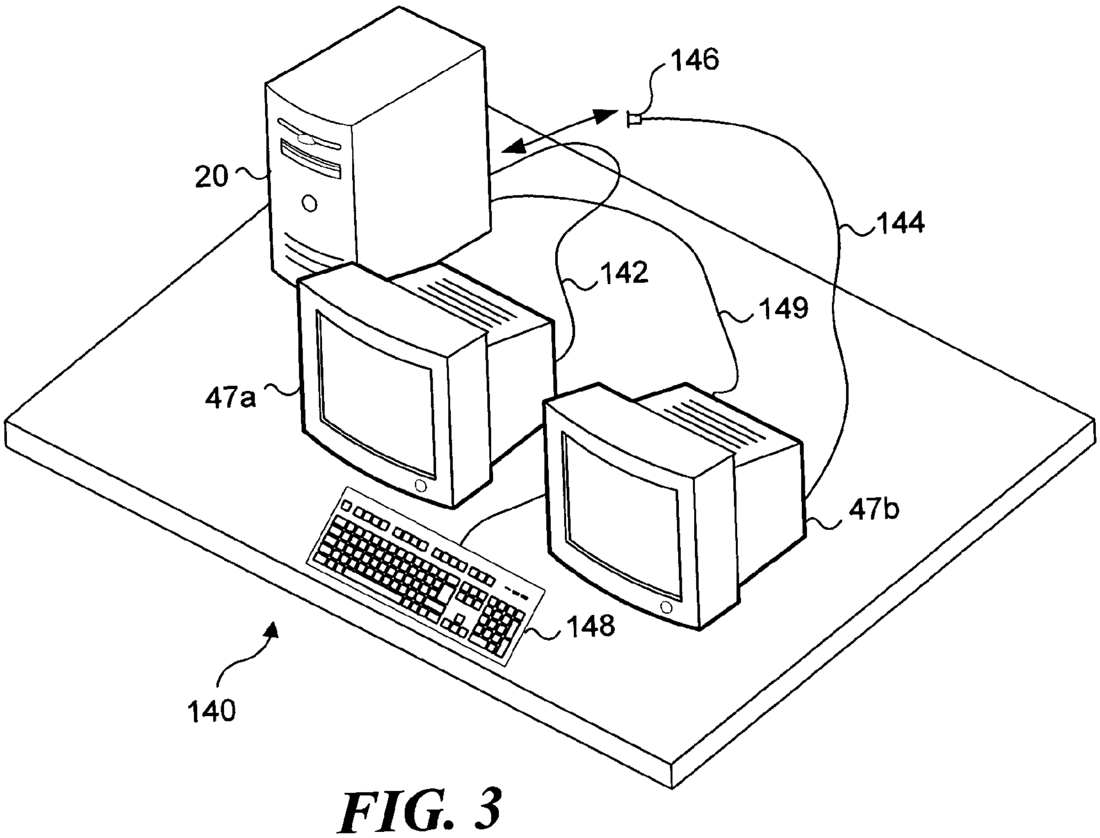
Figure 4:
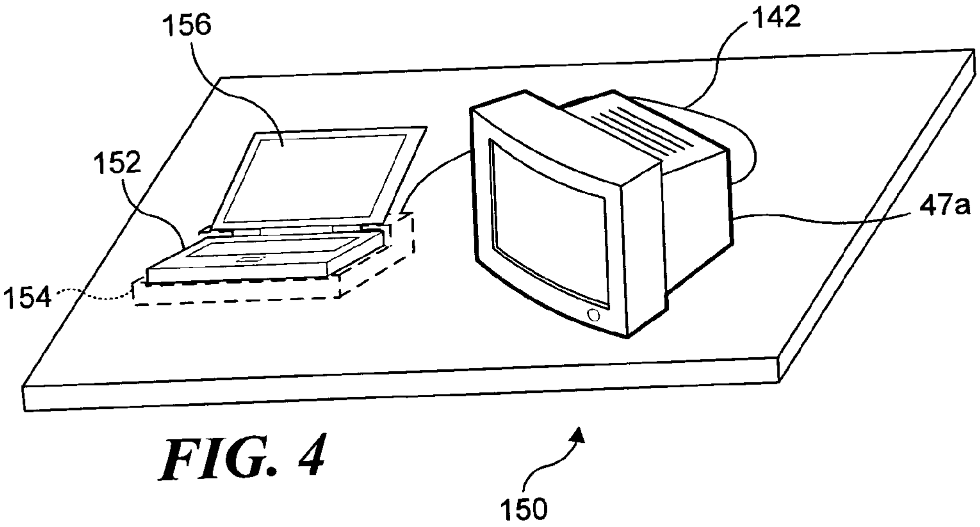

FIG. 3 is an isometric view of a computing system that includes a generally conventional PC with a display adaptor card like that of FIG. 2, so that the operating system executing on the PC can respond to the hot connection and disconnection of either of two analog monitors to the display adaptor card; and FIG. 4 is an isometric view of another computing system that includes a generally conventional laptop computer, an optional docking station, and an external analog monitor that is connectable to either the laptop or the optional docking station.

DESCRIPTION OF THE PREFERRED EMBODIMENT

Exemplary Computing System for Implementing Present Invention

Figure 1:
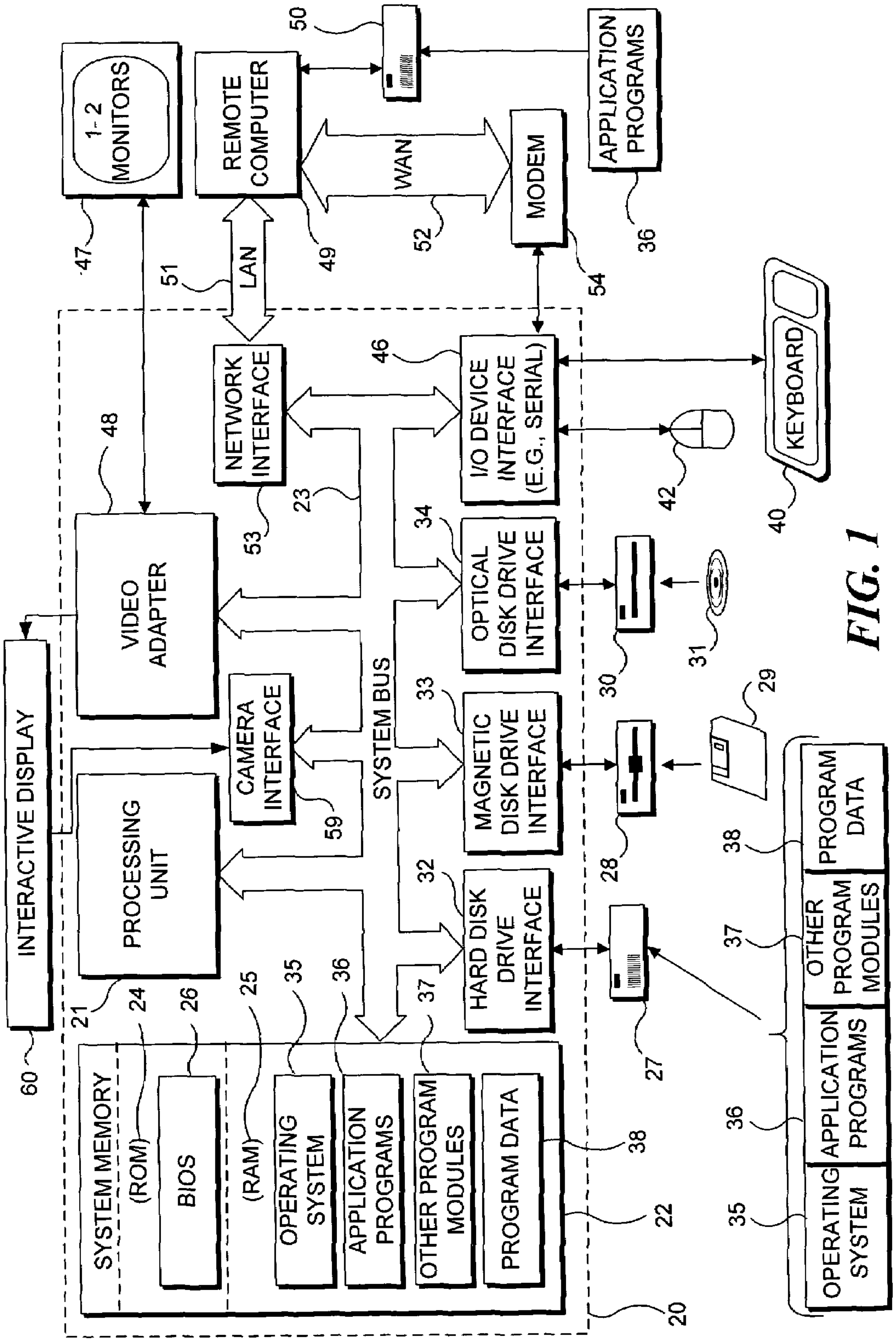
FIG. 1 is a functional block diagram of a computing device, such as a PC, which is suitable for use with a video graphics adaptor card that implements the present invention.

With reference to FIG. 1, an exemplary computing system suitable for use with a video graphics adaptor card that implements the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other such conventional pointing devices. As used herein, the term "mouse" is intended to encompass virtually any pointing device that is useful for controlling the position of a cursor on a screen of a display monitor. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals from a digital video camera that is included therein, as discussed below. The digital video camera may be instead coupled to an appropriate serial I/O port, such as to a USB version 2.0 port. A monitor 47 can be connected to system bus 23 by connecting to a video adapter 48 that includes circuitry in accord with the present invention. Video adaptor 48 can support a digital monitor, two analog monitors, or a single analog monitor, in connection with the present invention, also only a single analog monitor. The present invention may be practiced on a single machine, or can enable a monitor to be hot swapped between two different computers without using a special keyboard, video, mouse (KVM) switch. It will be appreciated that PCs are often coupled to other peripheral output devices (not shown), such as speakers (through a sound card or other audio interface—not shown) and printers.

PC 20 can operate in a networked environment using logical connections to one or more remote computers, such as a remote computer 49, which may be another PC, a server (typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Output Circuit of Convention Video Display Adaptor Card

As shown in FIG. 2A, a typical prior art video display adapter card 100 includes a red, green, blue (RGB) display driver circuit 110 that produces RGB color component digital signals used for driving a conventional analog video graphics adapter (VGA) monitor 102 to produce an image. Each of the RGB digital drive signals produced by RGB display driver circuit 110 is input to a separate digital-to-analog (DAC) converter 112 (only one shown), which converts the digital color component digital drive signal to a corresponding analog current, i.

A 75-ohm resistor 116 (only one shown) is connected between an output port terminal 108 of the video display adapter card and ground for each color component drive signal. Resistor 116 thus defines the output impedance of the video graphics card for one of the three color component drive signals that are provided to produce a color image on analog monitor 102. A conductor 114 conveying the electrical current that is output from DAC 112 for one of the color component digital drive signals is also coupled to output port terminal 108.

Analog monitor 102 is connected to output port terminal 108 so as to receive the color component drive signal that is connected to the monitor through a VGA cable 104, which has a grounded shield 106. To simplify the diagram, only one of the conductors is illustrated in VGA cable 104, but those of ordinary skill in the art will appreciate that for a color image to be produced on analog monitor 102, the other two color component signal leads and other required leads will also be included within VGA cable 104. Analog monitor 102 has a characteristic input impedance, which in this example, is equal to 75 ohms. The input impedance for one color component drive signal is provided by a resistor 130. The color component drive signal that it is conveyed from output port terminal 108 through VGA cable 104 is input to a voltage amplifier 132 that is part of a conventional analog monitor. The input impedance of voltage amplifier 132 is typically on the order of several megohms, so resistor 130 generally determines the input impedance of the analog monitor, as seen at output port terminal 108. In this embodiment, resistor 116 is equal in resistance to resistor 130 (i.e., both have a resistance of 75 ohms).

Circuit for Detecting Hot Connection/Disconnection of Analog Monitor Although it is possible that the present invention could be included as a separate circuit module inserted between the output port of a conventional video graphics card and an analog monitor input, in an exemplary preferred embodiment, it is included on a video display adapter card 100', which is shown in FIG. 2B. Video display adaptor card 100' includes many of the same components as prior art video display adaptor card 100 (FIG. 2A). As a further alternative, the present invention can be included on a computer motherboard (i.e., a main circuit board used in a computing device) that has an integral video graphics adaptor.

Preferably, the output port terminal used for the output of the green color component drive signal is employed when determining whether a monitor is coupled to video display adapter card 100'. The green color component drive signal output port terminal is preferred, because the green color component drive signal is used when a monochrome signal is supplied for driving a monochrome analog monitor, and thus that signal line will always be used when an analog monitor is connected to the output port to produce an image, regardless of whether the monitor is a color or a monochrome monitor.

Unlike the prior art video display adaptor card, video display adaptor card 100' includes a voltage comparator 118, which produces an indication of whether an analog monitor is currently connected to the video display adaptor card. Also included is a negative current source (or current sink) 134, which is coupled through an electronic switch 136 to ground. The negative current source is also coupled to output port terminal 108, so that when enabled and active, the negative current it produces causes a negative voltage level across resistor 116 and thus, on output port terminal 108. Electronic switch 136 is only closed during a blanking interval of any the color component drive signals to enable negative current source 134, since during the blanking interval, the output of DAC 112 is zero and the negative voltage level developed across resistor 116 as a result of the negative current source being enabled will not have any effect on an image being displayed by analog monitor 102, if the analog monitor is then connected to the output port. Video display adaptor card 100' (and also 100) provide a timing signal to the computing device with which the video display adaptor card is used, and the time signal clearly indicates when the vertical and the horizontal blanking intervals occur, so that same timing signal can be employed in controlling electronic switch 136 to only close during the blanking interval.

The blanking interval used in a preferred embodiment is the vertical blanking interval, which occurs as an electron beam returns to the top of a next image scan from the bottom of a current image scan, although the much shorter horizontal blanking interval that occurs between the end of a scan of one line and the start of the scan of the next line in a current image could instead be used in the present invention. The vertical blanking interval is preferred, because it is longer in duration and provides more time for monitoring the negative voltage level at output port terminal 108. Typically, the vertical blanking interval will occur at least 60 times per second.

A first voltage, $V_a$, which is equal to the product of negative electrical current q and 75 ohms, appears at output port terminal 108 when an analog monitor 102 is NOT connected to the output port. However, FIG. 2B shows analog monitor 102 connected to output port 108.

Voltage comparator 118 has one input connected through a lead 124 to output port terminal 108 and another input connected through a lead 122 to a reference voltage, about −0.5 volts $V_{REF}$, at 120. The negative voltage produced on output port terminal 108 is selected to be less than any voltage that might activate electro-static discharge protection circuitry in analog monitor 102. Accordingly, the level of the reference voltage is selected based upon the negative voltage levels expected to be applied at output port terminal 108 during the blanking interval, which in this embodiment, are about −0.7 volts when analog monitor 102 is connected to output port terminal 108 and about −0.35 volts when the analog monitor is not thus connected. The relative values of the negative voltage on output port terminal 108 and the reference voltage cause an output from voltage comparator 118 appearing on a lead 126 to be either in a first state or a second state, depending upon whether analog monitor 102 is connected to output port terminal 108 or is not connected.

Clearly, during the blanking interval, the negative voltage applied to the input of voltage comparator 118 on lead 124 when monitor 102 is connected to output port terminal 108 will be about one half that when monitor 102 is not connected to output port terminal 108 on video display adapter card 100. This result will be evident, because connecting the analog monitor to the output port terminal places the input impedance of the analog monitor (resistor 130, which is about 75 ohms) in parallel with the output impedance of output port terminal 108 (resistor 116, which is also about 75 ohms).

Further, the indication provided at the output of voltage comparator 118 on lead 126 in regard to the state of analog monitor 102 being connected or not connected to video display adapter card 100 is readily discerned by an operating system that is executed by a computing device, such as PC 20, in which video display adaptor card 100' is installed. It is important to appreciate that the indication at the output of voltage comparator 118 on lead 126 is only considered by the computing device during the blanking interval, since that is the only time that the state of the connection of analog monitor 102 to video display adapter card 100 is being determined by the present invention. The operating system can thus hot detect the connection and the disconnection of analog monitor 102 from the video display adapter card. Also, unlike the prior art, it is not necessary to reboot the computing system to change the connected/disconnected state of the analog monitor.

As a result of the indication being provided by voltage comparator 118 to the operating system on lead 126, the operating system can respond appropriately when analog monitor 102 is connected or disconnected from the video display adapter card. If the analog monitor is disconnected, the operating system will no longer continue to display any portion of an application or a desktop display that was previously displayed on analog monitor 102. Similarly, if analog monitor 102 is connected to the video graphic adaptor, the operating system can readily respond to the change in state by enabling images to be displayed on analog monitor 102, and these images can be part of the desktop display or a screen for any application being executed by the computing device in which video display adapter card 100 is installed.

Exemplary Use of the Present Invention

FIGS. 3 and 4 illustrate two examples of how the present invention can be used in two different computing systems. In FIG. 3, a computing system 140 includes PC 20, which has a video graphics adapter card (not shown) that is capable of driving to analog monitors 47*a* and 47*b*. Monitor 47*a* includes a VGA cable 142 that is connected to the video graphics adapter card in PC 20, while monitor 47*b* has a VGA cable 144 with a connector 146 that is currently not connected to the video graphics adapter card in PC 20, but can be at connected at any time. A keyboard 148 is also connected to PC 20 through a lead 149. Initially, a user may be using only monitor 47*a* for viewing the desktop displayed by the operating system executing on PC 20, and/or a screen produced by executing a software application, such as a word processing program. The user may want to split the desktop being displayed, or the screen produced by the application software between monitor 47*a* and monitor 47*b,* or may want to execute a second application and display that second application on monitor 47*b*. Accordingly, the user can achieve any of these and other desired results that require a second monitor simply by plugging connector 146 into the video graphics adapter card on PC 20. In response, the present invention will hot detect the connection of the second monitor and produce an indication of the second monitor being connected, as described above. In response to this indication, the operating system is made aware that monitor 47*b* is now connected and can be used for any desired display purposes, such as those noted above.

FIG. 4 illustrates a computer system 150 that includes a generally conventional laptop computer 152, which optionally may be connected to a docking station 154. Laptop computer 152 includes a display 156. In addition, monitor 47*a* is shown connected through a VGA cable 142, either directly to laptop 152, or if optional docking station 154 is being used, to an external video adapter port provided on the rear of the docking station (not shown). In this configuration, a user can employ monitor 47*a* for any desired purpose, such of those discussed above, but also has the option of disconnecting the external monitor at any time without rebooting the laptop. If the user chooses to disconnect monitor 47*a,* the operating system running on laptop 152 will be made aware of this disconnection and will no longer attempt to display any image on monitor 47*a,* but will use only display 156 on the laptop. Accordingly, it will be apparent that a substantially improved versatility is provided by using the present invention to detect the hot connection/disconnection of monitor 47*a* to/from computer system 150 and responding accordingly with the operating system and any applications running on the laptop.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. In a computing system supporting dual monitors, a method for responding to a change in the connection status of a secondary generally conventional analog monitor associated with the computing system, the method comprising the steps of:

(a) monitoring a state of a signal at an output port of a video display adaptor, the signal being provided only during a blanking interval of a monitor output signal that is applied to the output port to drive the secondary analog monitor, wherein the signal is provided by a negative current source that is connected between the output port and ground only during the blanking interval;

(b) detecting a change in state of the signal that occurs in response to one of:

(i) a secondary analog monitor being connected to the output port, an input impedance of said secondary analog monitor causing the state of the signal to change in a first predefined manner when the input impedance of the secondary analog monitor is coupled to the output port; and (ii) the secondary analog monitor being disconnected from the output port, a removal of the input impedance of said secondary analog monitor causing the state of the signal to change in a second predefined manner as a result of the input impedance of the secondary analog monitor no longer being coupled to the output port; and (c) providing an indication of any change in the state of the signal to the computing system; and (d) in response to an indication of the secondary analog monitor being connected, enabling the display of an application or desktop on the secondary analog monitor in addition to a primary monitor, and in response to an indication of the secondary analog monitor being disconnected, disabling the display of any portion of the application or the desktop on the secondary analog monitor so that the application or desktop is displayed on the primary monitor.

2. The method of claim 1, wherein the signal has a negative voltage level that is developed across an output impedance of the output port, and wherein changes in the voltage level are indicative of a change in the state of the signal.

3. The method of claim 2, wherein the negative voltage level changes substantially when the secondary analog monitor is connected to the output port because the input impedance of the secondary analog monitor is then connected in parallel with the output impedance of the output port.

4. The method of claim 1, wherein a switch coupled between the negative current source and the ground is closed during the blanking interval to provide the signal.

5. The method of claim 1, wherein the step of monitoring the state of the signal comprises the step of comparing a voltage level of the signal to a reference voltage, a change in state being detected when a relationship between the voltage level of the signal and the reference voltage changes substantially.

6. The method of claim 1, wherein the signal is applied during the blanking interval to one of a green drive signal line, a red drive signal line, and a blue drive signal line that is coupled to the output port.

7. The method of claim 1, further comprising the steps of:

(a) only detecting the indication of any change in the state of the signal during the blanking interval; and (b) supplying the indication to an operating system that is executing on a computing device, to enable the operating system to respond to the connection or disconnection of the secondary analog monitor at the output port.

8. The method of claim 1, further comprising, executing an application and displaying an image associated with the application on the secondary analog monitor rather than the primary monitor.

9. A circuit for detecting whether a secondary generally conventional analog monitor is connected to a computing device supporting multiple monitors, comprising:

(a) a comparator for comparing a reference signal to a negative signal that is provided to an output port, said output port also being connected to receive a color signal for output to an analog monitor to produce an image, said comparator producing an indication of whether an analog monitor is currently:

(i) connected to the output port, or (ii) disconnected from the output port; and (b) a negative current source that is connected between the output port and ground only during a blanking interval of the color signal, the negative current source then causing the negative signal to be developed at the output port for input to the comparator only during the blanking interval, said negative signal having a first level if an analog monitor is coupled to the output port, and a second level that is different than the first level if an analog monitor is not connected to the output port, whereby the indication produced by the comparator changes in response to changes between the first and the second level of the negative signal, to indicate whether a secondary analog monitor is currently connected to the output port, or is currently disconnected from the output port, wherein in response to changes between the first and the second level of the negative signal, to indicate whether a secondary analog monitor is currently connected to the output port, or is currently disconnected from the output port, wherein in response to an indication of the secondary analog monitor being connected, enabling the display of an application or desktop on the secondary analog monitor in addition to a primary monitor, and in response to an indication of the secondary analog monitor being disconnected, disabling the display of any portion of the application or the desktop on the secondary analog monitor so that the application or desktop is displayed on the primary monitor.

10. The circuit of claim 9, wherein the negative signal is developed across an impedance that is coupled between the output port and ground.

11. The circuit of claim 9, further comprising an electronic switch that controls the negative current source so that the negative signal is applied to the output port and the comparator only during the blanking interval of the color signal.

12. The circuit of claim 9, wherein the color signal comprises one of a green drive signal, a red drive signal, and a blue drive signal.

13. The circuit of claim 9, wherein the comparator and the negative current source are disposed on a display adaptor card that is adapted to be connected to a computing device.

14. The circuit of claim 9, wherein the comparator comprises a voltage comparator having an output, the voltage comparator comparing a reference voltage level to a voltage level of the negative signal and producing the indication on the output of the voltage comparator as a function of the relative difference between the reference voltage level and the voltage level of the negative signal.

15. The circuit of claim 9, wherein the indication produced by the comparator is adapted to be conveyed to a computing device, to enable an operating system executing on the computing device to respond in a predefined manner to the indication of whether a secondary analog monitor is currently connected to the output port, or is currently disconnected from the output port.

16. The circuit of claim 9, wherein the blanking interval is one of:

(a) a vertical blanking interval of the color signal; and (b) a horizontal blanking interval of the color signal.

17. A display adaptor card adapted to be used with a computing device supporting multiple monitors to drive a secondary analog monitor, said display adaptor card being configured to detect when a secondary analog monitor is connected to the display adaptor card, comprising:

(a) a video graphics adaptor driver that produces a red color component signal, a green color component signal, and a blue color component signal on an output port, said color component signals being output to drive a secondary analog monitor to produce an image, wherein when the secondary analog monitor is connected, the video graphics adaptor driver displays an application or desktop on the secondary analog monitor in addition to a primary monitor, and when the secondary analog monitor is not connected, the video graphics adapter driver disables the display of any portion of the application or the desktop on the secondary analog monitor so that the application or desktop is displayed only on the primary monitor;

(b) a negative current source that is connected between the output port and ground only during a blanking interval, the negative current source developing a negative voltage level on the output port only during the blanking interval of the color component signals; and (c) a voltage comparator that has one input coupled to the output port and another input coupled to a reference voltage, said voltage comparator responding to a relative level between the reference voltage and the negative voltage level that is coupled to said output port during the blanking interval, by producing an indication of whether:

(i) a secondary analog monitor is currently connected to the output port; or (ii) a secondary analog monitor is currently disconnected from the output port.

18. The display adaptor card of claim 17, further comprising a switch that enables the negative current source to be active in causing the negative voltage level only during the blanking interval of the color component signals.

19. The display adaptor card of claim 17, wherein the indication produced by the voltage comparator changes when a secondary analog monitor is connected to the output port, because an input impedance of the secondary analog monitor substantially changes the negative voltage level applied to the one input of the voltage comparator during the blanking interval.

20. The display adaptor card of claim 17, wherein the display adaptor card is adapted to provide the indication to a computing device to which the display adaptor card is connected, to enable an operating system executing on the computing device to control the display adaptor card in a manner consistent with whether a secondary analog monitor is currently connected to the output port, or is currently disconnected from the output port.

21. The display adaptor card of claim 20, wherein a state of the blanking interval is supplied to a computing device by the video graphics adaptor driver, to enable the computing device to only respond to the indication from the voltage comparator during the blanking interval.

* * * * *

UNITED STATES PATENT AND TRADEMARK OFFICE

CERTIFICATE OF CORRECTION

PATENT NO. : 7,477,247 B2
APPLICATION NO. : 11/056770
DATED : January 13, 2009
INVENTOR(S) : Dawson Yee It is certified that error appears in the above-identified patent and that said Letters Patent is hereby corrected as shown below:

In column 9, line 56, in Claim 4, delete “the ground” and insert -- ground --, therefor.

In column 10, lines 37-41, in Claim 9, after “response to” delete “changes between the first and the second level of the negative signal, to indicate whether a secondary analog monitor is currently connected to the output port, or is currently disconnected from the output port, wherein in response to”.

Signed and Sealed this
Tenth Day of May, 2011

David J. Kappos
*Director of the United States Patent and Trademark Office*